(12) United States Patent
Weis et al.

(10) Patent No.: US 9,300,642 B2
(45) Date of Patent: Mar. 29, 2016

(54) RESTARTING NETWORK REACHABILITY PROTOCOL SESSIONS BASED ON TRANSPORT LAYER AUTHENTICATION

(75) Inventors: Brian Weis, San Jose, CA (US); Mahesh Jethanandani, Saratoga, CA (US); Keyur Patel, San Jose, CA (US); Anantha Ramaiah, San Jose, CA (US)

(73) Assignee: Cisco Technology, Inc., San Jose, AZ (US)

( * ) Notice: Subject to any disclaimer, the term of this patent is extended or adjusted under 35 U.S.C. 154(b) by 770 days.

(21) Appl. No.: 12/942,588

(22) Filed: Nov. 9, 2010

(65) Prior Publication Data

US 2012/0117248 A1     May 10, 2012

(51) Int. Cl.
| | |
|---|---|
| G06F 15/16 | (2006.01) |
| H04L 29/06 | (2006.01) |
| H04L 12/755 | (2013.01) |
| H04L 12/721 | (2013.01) |
| H04L 12/26 | (2006.01) |
| H04L 12/751 | (2013.01) |
| H04L 12/703 | (2013.01) |
| H04L 12/715 | (2013.01) |

(52) U.S. Cl.
CPC ............... *H04L 63/06* (2013.01); *H04L 43/12* (2013.01); *H04L 45/02* (2013.01); *H04L 45/021* (2013.01); *H04L 45/04* (2013.01); *H04L 45/12* (2013.01); *H04L 45/28* (2013.01); *H04L 45/70* (2013.01); *H04L 63/08* (2013.01)

(58) Field of Classification Search
CPC ......... H04L 43/12; H04L 45/02; H04L 45/28; H04L 45/12; H04L 45/70; H04L 45/021

USPC ........................................................ 709/227
See application file for complete search history.

(56) References Cited

U.S. PATENT DOCUMENTS

| | | | |
|---|---|---|---|
| 6,339,595 B1 * | 1/2002 | Rekhter et al. ................ 370/392 |
| 6,704,795 B1 * | 3/2004 | Fernando et al. ............ 709/237 |
| 6,708,209 B1 * | 3/2004 | Ebata et al. .................... 709/223 |
| 7,194,761 B1 * | 3/2007 | Champagne ...................... 726/6 |
| 7,864,706 B1 * | 1/2011 | Zinjuwadia et al. .......... 370/254 |
| 8,072,901 B1 * | 12/2011 | Blair et al. .................... 370/254 |
| 8,140,851 B1 * | 3/2012 | Mynam et al. ................. 713/178 |
| 2002/0071390 A1 * | 6/2002 | Reeves et al. ................. 370/235 |
| 2002/0196802 A1 * | 12/2002 | Sakov et al. ................... 370/432 |
| 2003/0021232 A1 * | 1/2003 | Duplaix et al. .............. 370/238 |
| 2004/0039840 A1 * | 2/2004 | Dispensa et al. ............. 709/242 |
| 2005/0027859 A1 * | 2/2005 | Alvisi et al. ................... 709/224 |
| 2006/0002292 A1 * | 1/2006 | Chang et al. ................... 370/225 |
| 2007/0005973 A1 * | 1/2007 | Mynam et al. ................ 713/171 |
| 2007/0101129 A1 * | 5/2007 | Wong et al. ................... 713/160 |
| 2009/0016356 A1 * | 1/2009 | He et al. .................... 370/395.31 |
| 2009/0245099 A1 * | 10/2009 | Tsuchiya ...................... 370/221 |
| 2010/0080115 A1 * | 4/2010 | Yang et al. .................... 370/216 |
| 2010/0265956 A1 * | 10/2010 | Li .................................. 370/401 |

* cited by examiner

*Primary Examiner* — Blake Rubin
(74) *Attorney, Agent, or Firm* — Hickman Palermo Becker Bingham LLP

(57) ABSTRACT

In an embodiment, a method comprises establishing a first data communications session with a first router. In response to receiving a first request to establish a second data communications session, a probe message that is configured to test whether the first data communications session or the first router is responsive is sent to the first router. In response to determining that the first router has not acknowledged the probe message before a probe timer has expired, and receiving a second request to establish the second data communications session, the second data communications session with the first router is established and a state for the first data communications session is deleted.

21 Claims, 9 Drawing Sheets

RESTARTING NETWORK REACHABILITY PROTOCOL SESSIONS BASED ON TRANSPORT LAYER AUTHENTICATION

TECHNICAL FIELD

The present disclosure is generally related to data communications between routers, switches or other computers in a distributed network infrastructure, and specifically relates to restarting network reachability protocol sessions that are based on transport layer connections using authentication.

BACKGROUND

Network nodes can use authentication facilities in transport layer communication protocols, such as Transmission Control Protocol Authentication Option ("TCP-AO"), in a data communications network to authenticate each other. TCP-AO addresses network security and key rollover methods.

TCP-AO provides security measures for a variety of TCP applications. For example, TCP-AO may be executed by the peering nodes that implement a network reachability protocol such as Border Gateway Protocol ("BGP"), TCP applications such as a Label Distribution Protocol ("LDP"), a Protocol Independent Multicast ("PIM")-over-TCP, and Multicast Source Discovery Protocol ("MSDP")-over-TCP, etc.

In a network using TCP-AO, when a BGP peer router suffers a cold reboot after an unexpected restart, the time period for the BGP peers to recover from the reboot and to set up new BGP sessions with the rebooted peer may require considerable time.

A prolonged delay in reestablishing BGP connectivity in a TCP-AO network is primarily due to the fact that, upon rebooting a BGP peer in the TCP-AO network, other BGP peers do not recognize connectionless reset ("RST") segments sent by the rebooted BGP peer. Hence, upon a connectionless reset, other BGP peers do not try to reestablish communications sessions with the rebooted BGP peer for a relatively long period of time.

A connectionless TCP RST segment is an important part of the recovery process.

In a network with TCP-AO the connectionless TCP-RST segments are not recognized and not acted upon by the BGP peers. Therefore, the delay in reestablishing connectivity with a rebooted BGP router in a TCP-AO network may be considerably longer than in other networks.

Internet Request for Comments (RFC) 4727 describes graceful restart of a BGP router. However, the graceful restart approach may cause black-holing and looping issues. Due to these deficiencies, BGP graceful restart is not widely implemented.

DETAILED DESCRIPTION

Figure 1:
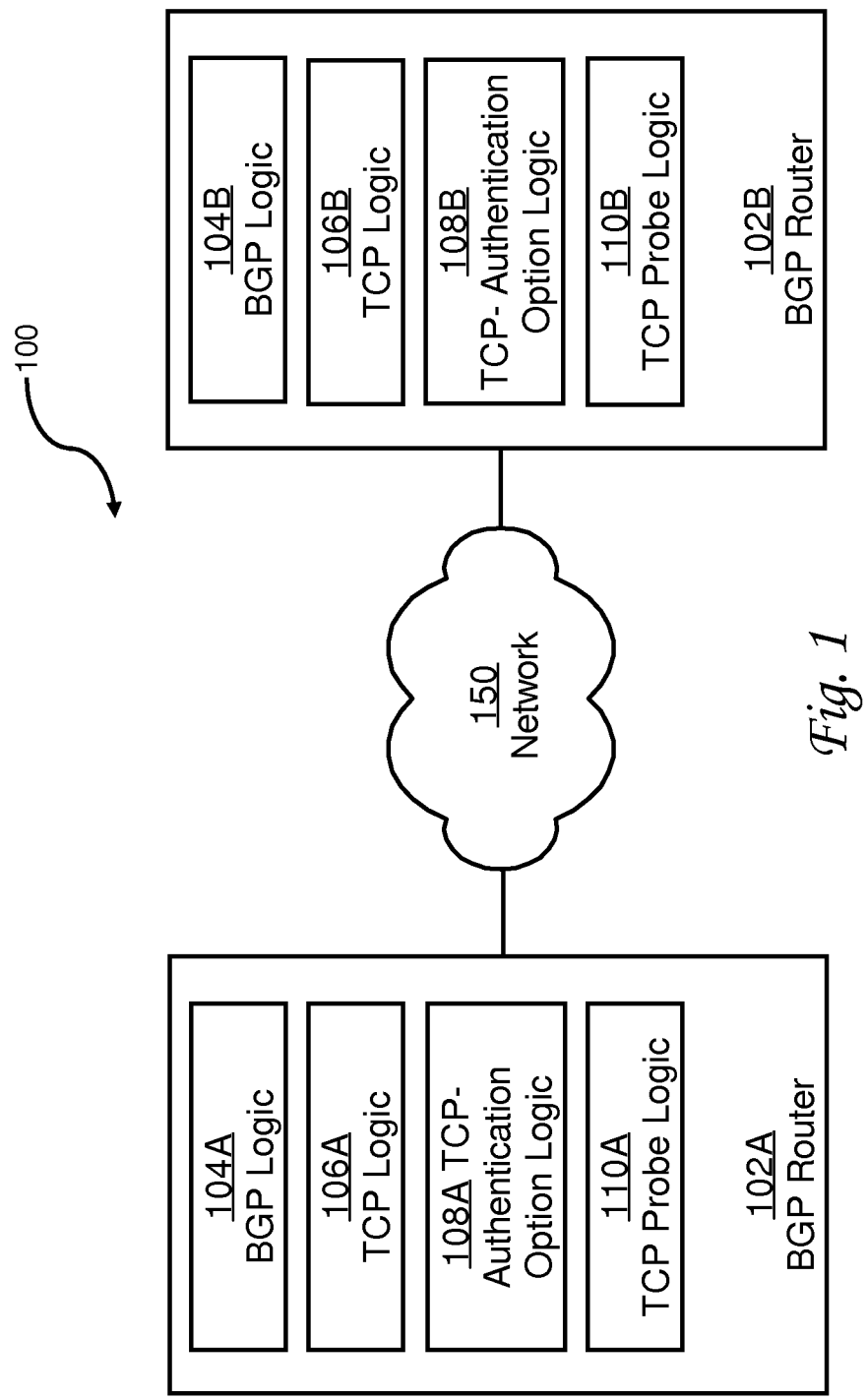
FIG. 1 illustrates an embodiment of routers in a network.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Structural and Functional Overview
  3.0 Providing connectionless reset support in a TCP-AO network—Example
  4.0 Providing connectionless reset support in a TCP-AO network—Example
  5.0 Providing connectionless reset support in a TCP-AO network—Example
  6.0 Network Congestion Considerations
  7.0 Network Security Considerations
  8.0 Implementation Mechanisms—Hardware Overview
  9.0 Extensions and Alternatives
  1.0 General Overview In an embodiment, a method comprises establishing a first data communications session with a first router. In response to receiving a first request to establish a second data communications session, a probe message that is configured to test whether the first data communications session or the first router is responsive is sent to the first router. In response to determining that the first router has not acknowledged the probe message before a probe timer has expired, and receiving a second request to establish the second data communications session, the second data communications session with the first router is established and a state for the first data communications session is deleted.

In an embodiment, the first data communications session and the second data communications session are secured sessions. A first set of keys is used in the first data communications session and a second set of keys is used in the second data communications session. In an embodiment, the probe message is secured with the first set of keys.

In an embodiment, the first router is a Border Gateway Protocol ("BGP") router, and the first data communications session and the second data communications session are Transmission Control Protocol ("TCP") sessions. In an embodiment, the first data communications session and the second data communications session support a Transmission Control Protocol Authentication Option ("TCP-AO").

In an embodiment, the probe message is any of a BGP keepalive message, a retransmission packet of a previously transmitted packet to the first router, or a TCP probe segment.

In an embodiment, the method further comprises continuing to accept first session data in response to determining that the first router acknowledged the probe message before the probe timer has expired.

2.0 Structural and Functional Overview

In general, the disclosure describes restarting network reachability protocol sessions that are based on transport layer authentication. Embodiments may be used in networks featuring a Border Gateway Protocol ("BGP") router that implements a Transmission Control Protocol Authentication Option ("TCP-AO"). A BGP router is a router that communicates with other nodes in a network using BGP. TCP-AO is an authentication option extension to the TCP and allows authentication of the peers that communicate with each other using TCP. TCP-AO is described, for example, in RFC 5925, available over the Internet at the time of submitting this application. While certain embodiments are described in the context of BGP and TCP-AO, other embodiments may be used with other network reachability protocols, other transport layer protocols, and other transport layer authentication mechanisms.

In certain embodiments, the disclosure provides techniques for fast restart of a BGP router that address deficiencies of TCP-AO, in which a conventional BGP router that implements TCP-AO otherwise could not reestablish a session with a rebooted BGP router within an acceptable time period. Embodiments may shorten the convergence time after reboot of a TCP-AO router.

FIG. 1 illustrates an embodiment of routers in a data communications network 100. In an embodiment, network 100 is a packet-switched data network and the nodes comprise routers, switches, or other infrastructure elements; in some embodiments, the nodes may comprise computers or other endpoints.

In an embodiment, a data communications network 150 is communicatively coupled to two or more routers 102A, 102B.

In an embodiment, routers 102A, 102B are BGP routers that implement TCP-AO, and are configured to authenticate each other upon establishing a communications session with each other.

For simplicity and for purposes of illustrating clear examples, FIG. 1 shows two routers 102A, 102B. However, practical embodiments may use any number of routers.

Routers 102A, 102B may use hardware logic such as in an application-specific integrated circuit ("ASIC"), field-programmable gate array ("FPGA"), system-on-a-chip ("SoC") or other combinations of hardware, firmware and/or software.

In an embodiment, routers 102A, 102B comprise hardware or software logic configured to generate and maintain the routing and forwarding information, and to process and transmit data packets to other nodes in a network. In an embodiment, the routers 102A, 102B are configured to transmit data packets to another node according to BGP and are configured to use TCP-AO.

In an embodiment, router 102A comprises BGP logic 104A, TCP logic 106A, TCP Authentication Option logic 108A and TCP probe logic 110A.

In an embodiment, router 102B comprises BGP application logic 104B, TCP logic 106B, TCP Authentication Option logic 108B and TCP probe logic 110B.

In an embodiment, BGP logic 104A, 104B is configured to implement a version of BGP such as BGPv4. In another embodiment, BGP logic 104A, 104B implements another network reachability protocol.

In an embodiment, TCP logic 106A, 106B implements TCP. In other embodiments, TCP logic 106A, 106B implements another transport layer protocol such as SCTP.

In an embodiment, TCP Authentication Option logic 108A, 108B is configured to authenticate TCP peers. The TCP Authentication Option provides means for peers of a router and other TCP applications to authenticate each other.

In an embodiment, TCP probe logic 110A, 110B is configured to generate and transmit to a neighbor router a probe message. A probe message is created to test a connection with the neighbor node and to test responsiveness of the neighbor node. In an embodiment, a probe message is any of a BGP keep-alive message, a retransmission message of a previously transmitted packet, a TCP probe message comprising zero or one byte data segments, etc.

In an embodiment, while a first session is established between router 102A and router 102B, upon receiving from the router 102A a request to establish a second session with the router 102A, the TCP probe logic 110B of the router 102B sends a probe message to a router 102A. By sending the probe message to the router 102A, the router 102B attempts to determine a reason for receiving the request to establish the second session even though the router 102B still has state information for the first session with the router 102A.

The router 102B may send a probe message to the router 102A (or the converse) in a variety of situations. For example, the router 102B may send a probe message after the router 102A sent to the router 102B a request to establish a second session with the router 102B while the router 102B still maintains state information for a first session established with the router 102A.

In some situations, the router 102A may send a request to establish a second session with the router 102B even if a first session between the routers 102A and 102B has not been properly terminated. For example, the first session may not be properly terminated because the router 102A was unexpectedly rebooted. For instance, upon a cold reboot of the router 102A, the router 102A usually cannot send a reset ("RST") message to the router 102B to reset the first session established with the router 102B and indicate to the router 102B that the router 102B should delete the state information for the first session.

A cold reboot of a router may be initiated by a system administrator manually or automatically. For example, the administrator may reboot router 102A when the router 102A enters a hanging state, the router 102A has a system error, a power failure, etc. In such events, upon the "cold reboot," the router 102A may be unable to send a reset message ("RST") to the router 102B. Hence, the router 102B may not receive any indication that the router 102A does not maintain the first session with the router 102B.

When router 102A sends a request to establish a second communication session with router 102B while the router 102B still maintains a session state for the first session with the router 102A, the router 102B is configured to determine why such a request was sent. One way of determining a reason is for the router 102B to send a probe message to the router 102A.

In an embodiment, TCP Authentication Option logic 108A, 108B secures messages destined to a neighbor node. The messages may be secured with keys that have been generated from master keys exchanged with the neighbor node. For example, if router 102A exchanged the master keys with router 102B, and a first communications session has been established between the router 102A and the router 102B, then the router 102A may send a probe message to the router 102B by securing a BGP keep-alive message with the first set of keys.

Upon receiving a secured probe message, router 102A attempts to decrypt and recognize the message. For example, if the router 102A is active and if the first communications session between the router 102A and the router 102B is still active, then the router 102A can decrypt the secured probe message with the first set of keys and respond to the probe message by acknowledging receiving the valid probe message.

However, if the router 102A is non-responsive, then the router 102A cannot decrypt the secured probe message. Hence, the router 102B that sent the probe message may not receive a response to the probe message or an acknowledgement to the probe message from the router 102A.

Furthermore, if the router 102A is responsive, but the router 102A has terminated the first communications session between the router 102A and the router 102B, and deleted state information for the first communications session, then the router 102A does not have the first session key to decrypt the probe message, cannot decrypt the secured probe message with the first set of keys and cannot acknowledge receiving the probe message.

In an embodiment, TCP probe logic 110B creates a timer for an interval during which router 102B expects to receive an acknowledgement from router 102A that the router 102A received a probe message. If upon the expiration of the timer, the TCP probe logic 110B of the router 102B does not receive an acknowledgment from a neighbor node to which the probe message was sent, then the TCP probe logic 110B can determine that either the first session with the neighbor router was terminated for some reason, or that the neighbor router is non-responsive.

In an embodiment, TCP Authentication Option logic 108A, 108B is configured to receive a probe message from a TCP probe message 110A, 110B and to determine whether the probe message is valid. For example, the TCP Authentication Option logic 108A, 108B may try to decrypt the probe message using a set of keys that were exchanged with the neighbor node. The decryption may be successful if the TCP Authentication Option logic 108A, 108B has valid keys to decrypt the probe message. If the TCP Authentication Option logic 108A, 108B does not have the valid keys to decrypt the probe message, then the probe message may be discarded. The probe message may also be discarded if after decrypting the probe message the TCP Authentication Option 108A, 108B logic determines that the decrypted message is not a valid probe message.

If upon receiving a probe message from a neighbor node the TCP Authentication Option logic 108A, 108B cannot recognize the probe message, then the TCP Authentication Option logic 108A, 108B can discard the probe message without performing any processing of the probe message. This may happen when the TCP Authentication Option 108A, 108B of the router that received the probe message from the neighbor node that has already deleted a session state for a communications session with the neighbor node. For example, the neighbor node might have deleted the session state for the communications session, deleted the session keys generated for that session, terminated the communications session, etc., all of which may take place if the neighbor node was rebooted.

Figure 2:
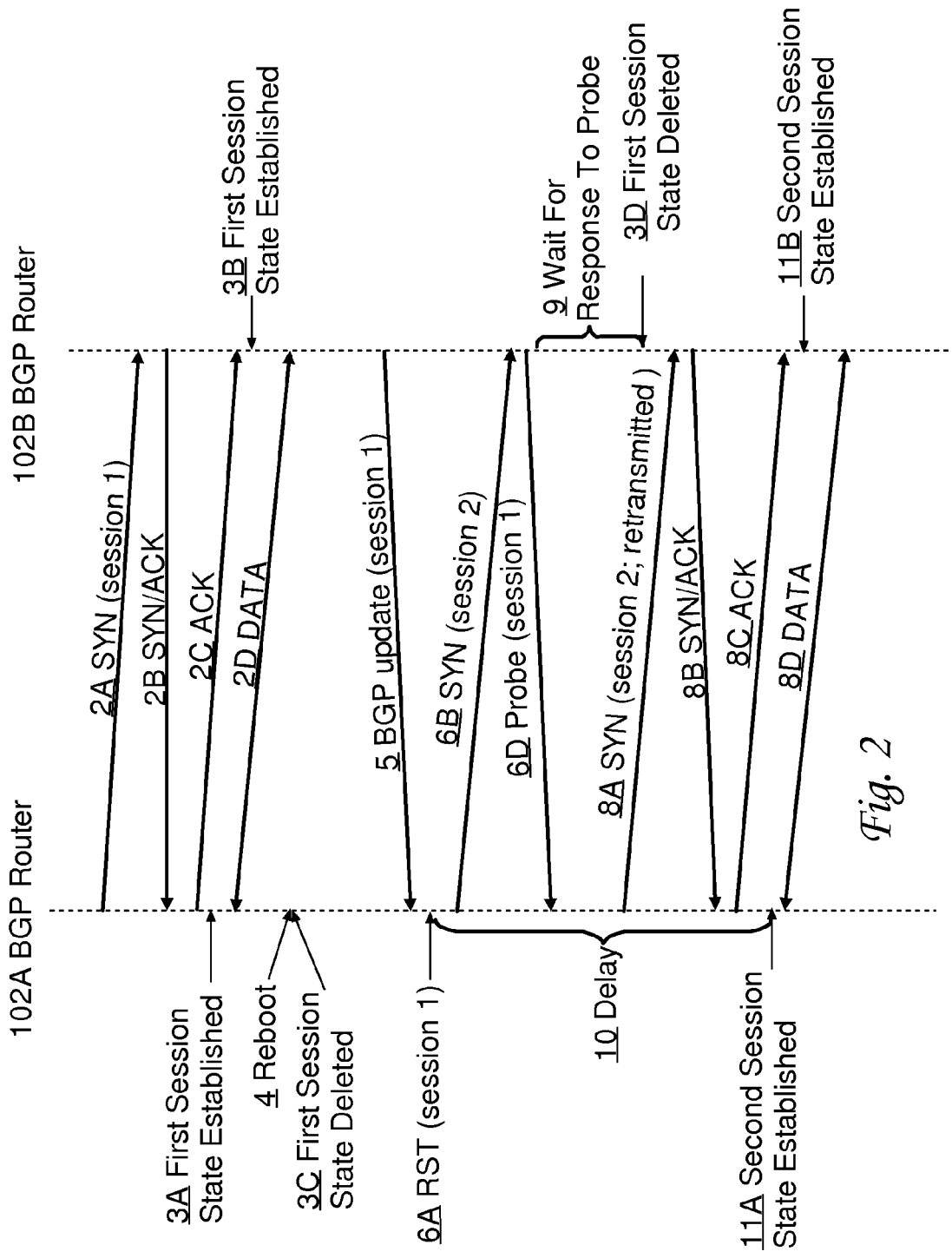
FIG. 2 illustrates an embodiment of communications between routers.
Figure 3:
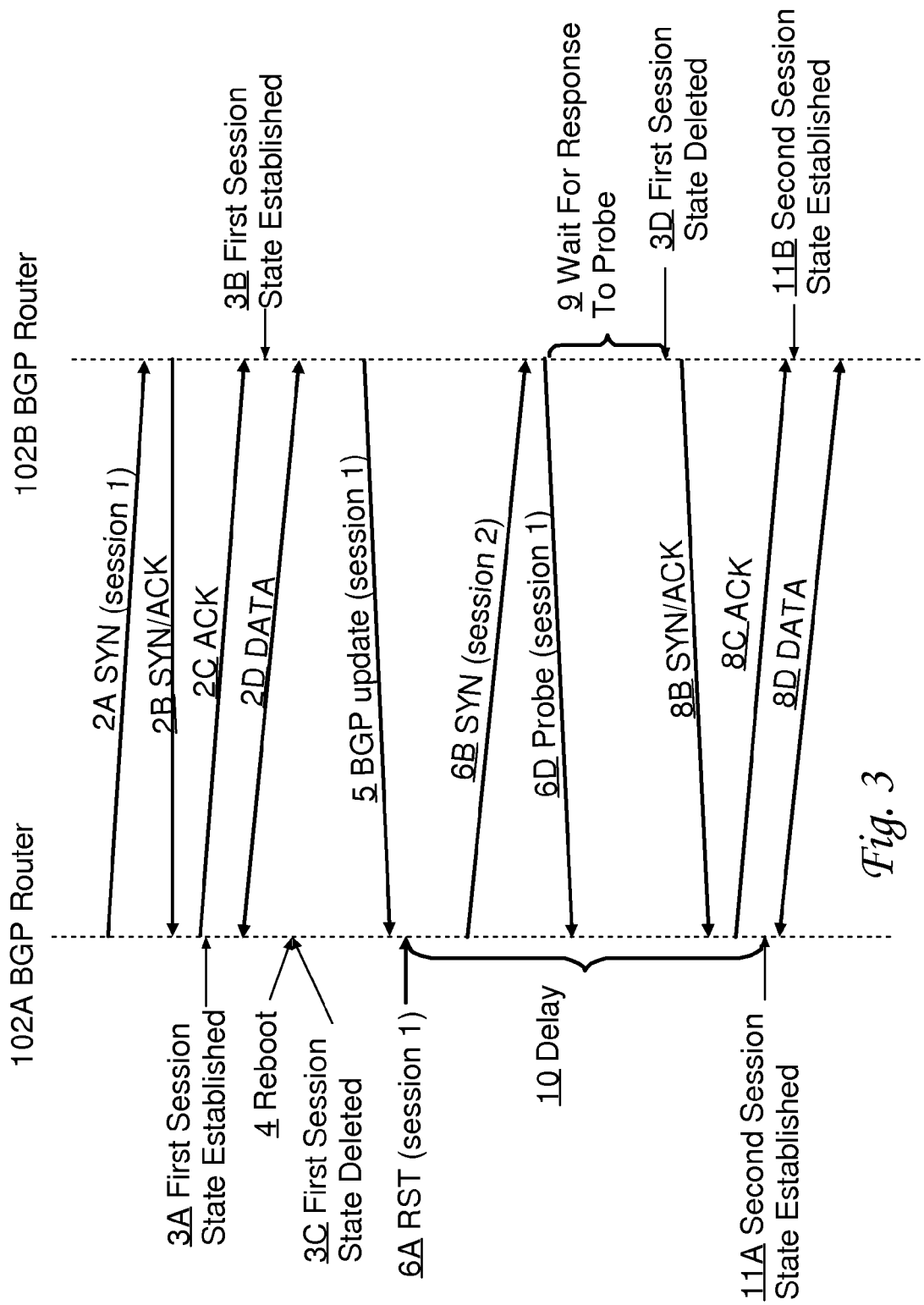
FIG. 3 illustrates another embodiment of communications between routers.
Figure 4:
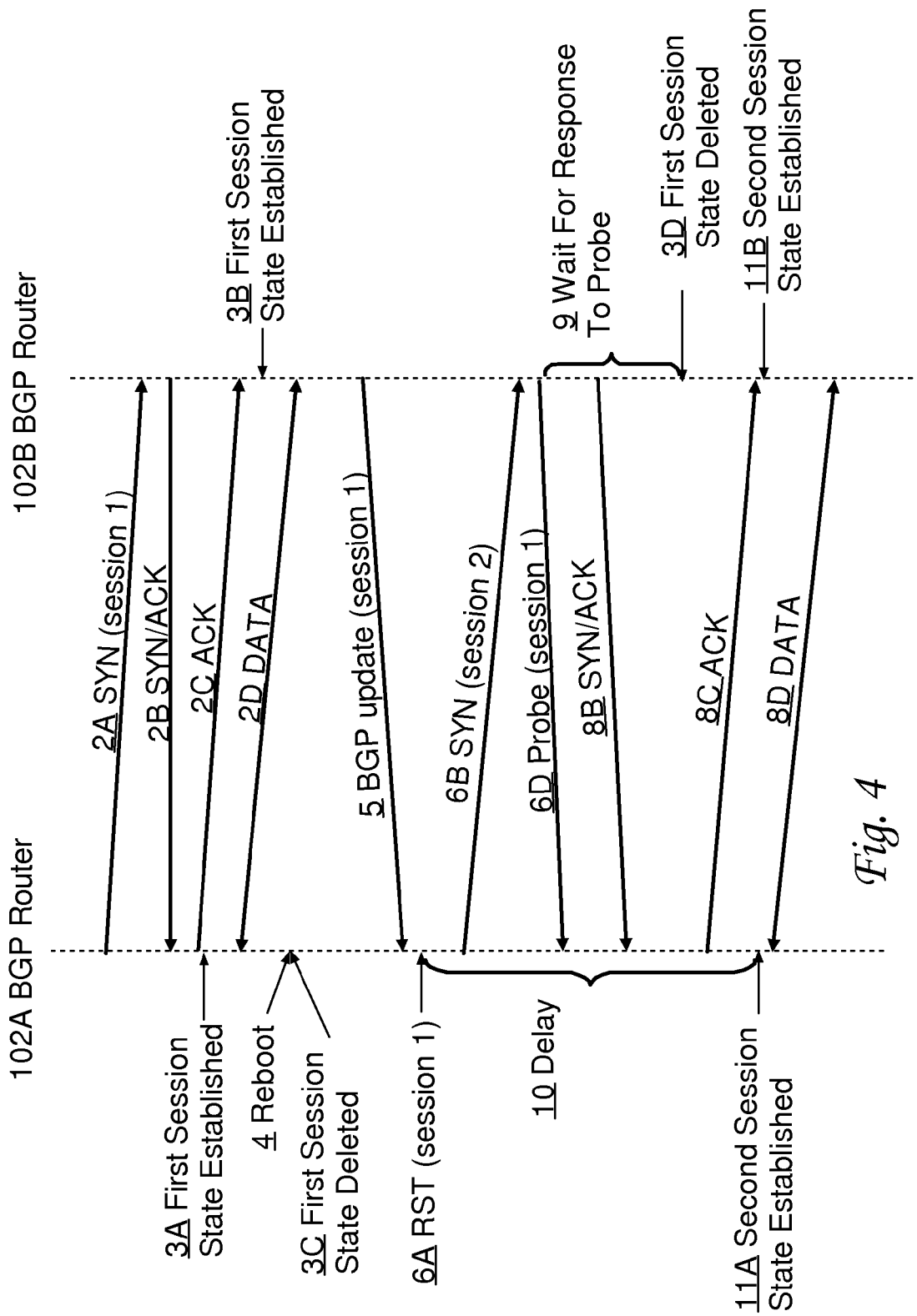
FIG. 4 illustrates another embodiment of communications between routers.
Figure 5:
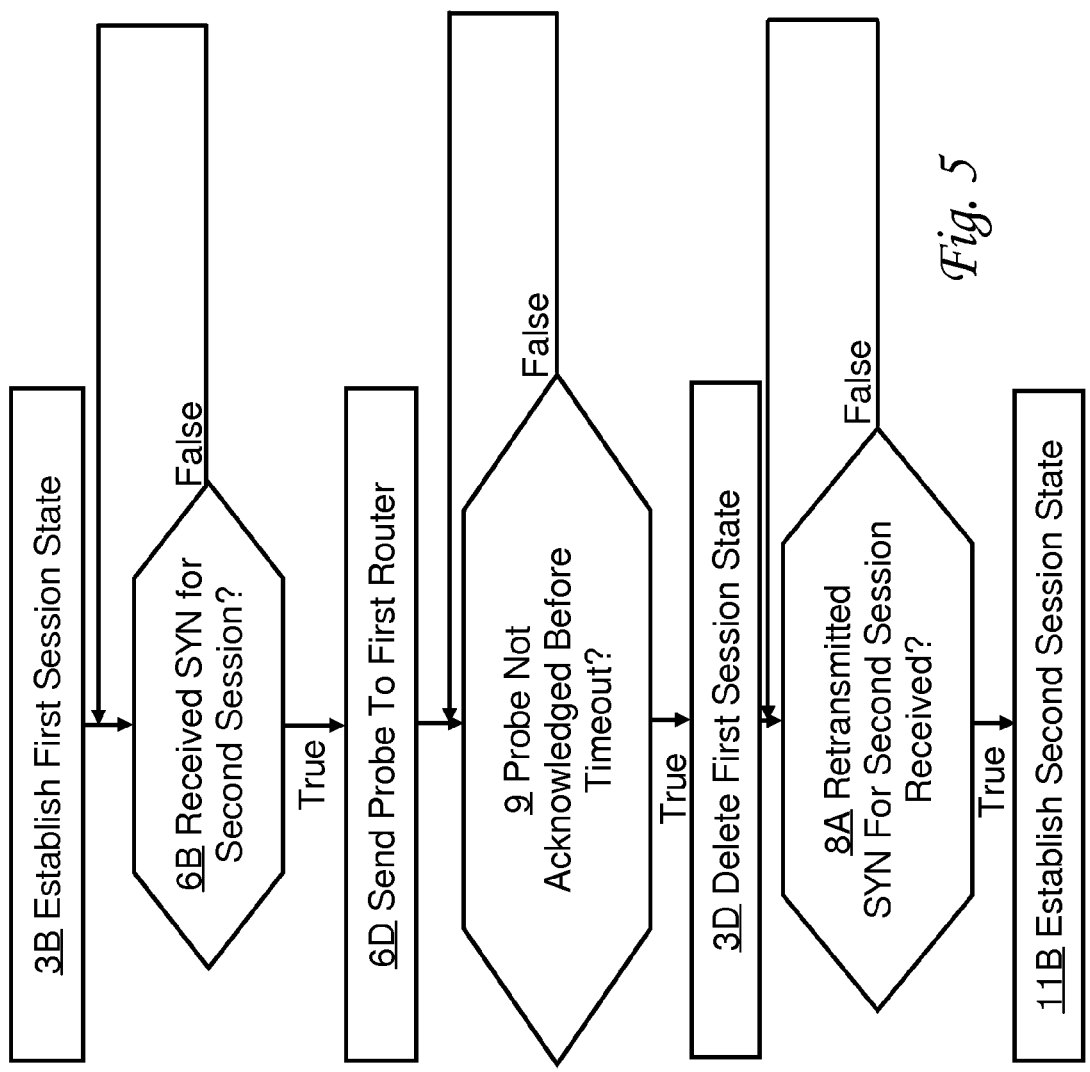
FIG. 5 illustrates an embodiment of connectionless reset support.
Figure 6:
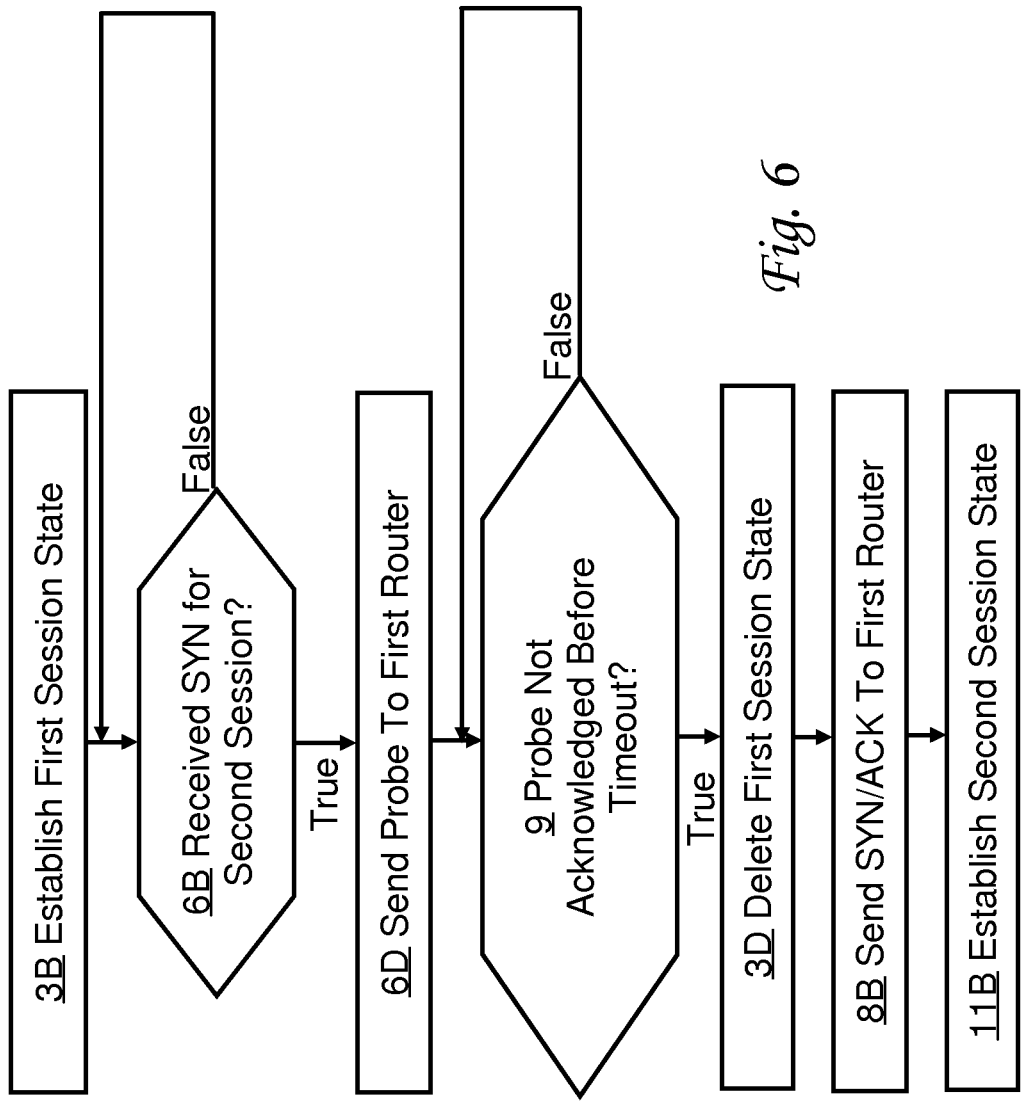
FIG. 6 illustrates another embodiment of connectionless reset support.
Figure 7:
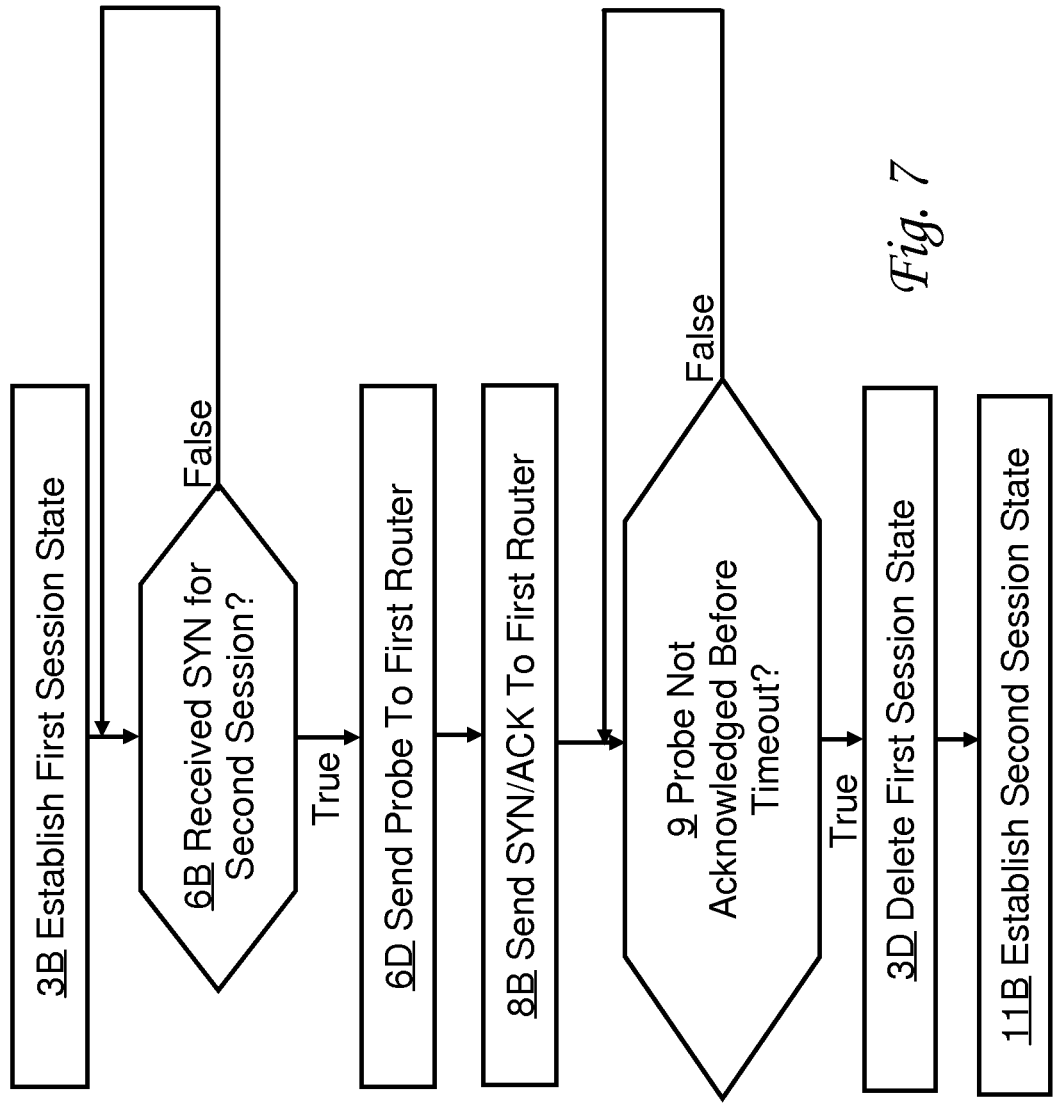
FIG. 7 illustrates another embodiment of connectionless reset support.

FIG. 2, FIG. 3 and FIG. 4 illustrate embodiments of communications between routers, and FIG. 5, FIG. 6 and FIG. 7 illustrate embodiments of connectionless reset support.

For simplicity and for purposes of illustrating clear examples, FIG. 2, FIG. 3 and FIG. 4 show two routers 102A, 102B. However, practical embodiments may use any number of routers. Further, FIG. 2, FIG. 3, and FIG. 4 show BGP TCP-AO routers. However, practical embodiment may use any type of routers implementing TCP-AO.

3.0 Providing Connectionless Reset Support in a TCP-AO Network—Example

Referring first to FIG. 2, in an embodiment a router 102A attempts to establish a first communications session with a router 102B and both are configured to implement TCP-AO.

Therefore, routers 102A, 102B have long-term master keys that the routers can use to generate session keys for a particular communications session.

In an embodiment, routers 102A, 102B have used their master keys to generate a first set of keys for a first communications session.

In an embodiment, a router 102A initiates a TCP three-way handshake to set up a first TCP-BGP session with a router 102B. For purposes of illustrating clear examples, the description herein pertains to establishing a first communications session between routers 102A, 102B. However, the description herein applies to establishing any new communications session between routers 102A, 102B. router To initiate the TCP three-way handshake, router 102A sends a synchronization ("SYN") segment 2A to router 102B in which the router 102A requests establishing a first communications session with the router 102B.

Sending the SYN segment 2A also sets the segment's sequence number for the first session between the router 102A and the router 102B to a random value.

In an embodiment, the SYN segment 2A is encrypted using a first set of keys, generated from the master keys described above.

In an embodiment, dynamic TCP-AO session keys are derived as part of a session establishing process. The dynamic TCP-AO keys may be created from some of the data that is associated with the session. For example, the dynamic TCP-AO keys may be derived from information pertaining to the routers 102A, 102B such as port numbers, device serial numbers, initial sequence numbers, etc.

In an embodiment, a master key or a set of master keys is used to generate a particular session key for a particular connection between a router 102A and a router 102B. The particular session key may be used to encrypt messages that the routers 102A, 102B send to each other.

Upon receiving the SYN segment 2A from a router 102A, a router 102B generates an acknowledgement to the SYN segment and encapsulates the acknowledgment into a SYN/ACK segment 2B.

In an embodiment, SYN/ACK segment 2B is encrypted using a first set of keys that the router 102B generated from the master keys received during initialization or configuration of the router.

Upon receiving SYN/ACK segment 2B from router 102B, router 102A generates and sends an acknowledgement or ACK segment 2C. Sending the ACK segment 2C is completes the TCP three-way handshake.

In an embodiment, ACK segment 2C is encrypted using the first set of keys that the router 102A generated from the master keys received during initialization or configuration.

Upon sending ACK segment 2C to router 102B, router 102A creates session state data for the first session that has been established with router 102B. Creating the state for the first session is completed shortly after the router 102B sends ACK segment 2C to router 102B, as indicated by element 3A, First Session State Established, in FIG. 2. The first session state comprises such information as a window size, a round trip time, a re-transmission queue containing copies of segments that have been sent but not yet acknowledged, values of timers, etc.

Upon receiving ACK segment 2C from router 102A, the router 102B creates session state data for the first session. Creating the state for the first session is completed shortly after the router 102B receives the ACK segment 2C from router 102A, as indicated by element 3B, First Session State Established, in FIG. 2

Once the routers 102A, 102B established their respective first session states, the routers start exchanging data 2D. In an embodiment, the data is transported using TCP.

Embodiments provide improvements in processing when one of the routers reboots after the first communication session is established. For simplicity and for purposes of illustrating clear examples, FIG. 2 depicts a situation in which the router 102A is rebooted.

In an embodiment, router 102A undergoes a cold reboot after a power-down or shutdown event. In an embodiment, the cold reboot causes deleting the first session state that was associated with the first session that the router 102A had established with a router 102B. Hence, upon the cold reboot, the first session between the router 102A and the router 102B has not been properly terminated.

At this point, router 102A may have no state information about the first session with the router 102B. For example, the router 102A may not have the encryption keys for the first session, and may not be able to decrypt first session message sent from the router 102B.

In an embodiment, upon a cold reboot, a router 102A also loses or deletes all dynamically generated TCP-AO encryption keys for a first session. Therefore, once the router 102A finishes its restart, the dynamic TCP-AO keys for the first session are unavailable and the router 102A cannot decrypt the first session messages and cannot encrypt messages that were encrypted using the first session dynamic TCP-AO keys.

In an embodiment, after rebooting, router 102A continues receiving TCP segments from router 102 B as part of the first communications session. However, since the router 102A has no session data for the first communications session, in accordance with TCP the router 102A sends a TCP reset (RST) message 6A. Since the router 102A no longer has the dynamic TCP-AO keys for the first communications session with router 102B, the router 102A cannot encrypt the TCP RST message 6A with the first session keys, and cannot send the encrypted TCP RST message 6A to the router 102B. Therefore, the TCP RST message will not be properly encrypted and if transmitted the router 102B will drop the message because it is not properly keyed under TCP-AO.

Assume that prior to the cold reboot, router 102A did not send a session reset message RST 6A secured with the first session keys. Therefore, router 102B has not received any indication that the router 102A was rebooted and the router 102A does not have state information for the first communication session. The router 102B might continue sending first session messages to the router 102A as part of the first communications session, and assume that the first session with the router 102A is still active.

Further, router 102A is unable to regenerate the first session keys for the first session because the router 102A no longer maintains the Initial Sequence Number (ISN) that had been used to generate the first session keys.

In an embodiment, after rebooting the router 102A attempts to establish a second communications session with router 102B. The router 102A may dynamically generate a second set of keys from the master keys that were provided to the router 102A during the router configuration phase and using the techniques for generating a first set of keys described above.

In an embodiment, router 102A sends a TCP SYN segment 6B to router 102B. In an embodiment, the TCP SYN segment 6B may be encrypted with the second session keys. The TCP SYN segment 6B is a request to establish a second communications session with router 102B.

Upon receiving TCP SYN segment 6B, router 102B attempts to process the request to establish the second communications session. However, if the router 102B still has first state information for the first session that was previously established with the router 102A, then the router 102B cannot accept the request.

If router 102B were a conventional TCP-AO router, then the router 102B would have continued rejecting the SYN segment 6B to establish a second communications session with the router 102A until either the router 102B received a RST message 6A for the first session from the router 102A, or until deleting the first session state for the first session with the router 102A. For example, the router 102B may delete the first session state if the router is reset, if the router times out the first communications session due to the session inactivity, etc. For instance, in some embodiments the router 102B times out the first communications session after some time of inactivity. In an embodiment, the time of inactivity is 180 seconds. In another embodiment, the time of inactivity is a configured BGP hold-timeout interval. The time period of inactivity (e.g. default value is 180 seconds) is relatively long, and is a drawback of TCP-AO.

Embodiments herein may provide the benefit of significantly shortening the time period for reestablishing a BGP session on with the rebooted router. The approaches may be implemented in a variety of BGP networks. The approaches use TCP-AO's security benefits and are expected to be operationally acceptable and reliable.

In an embodiment, BGP permits two routers to have only one active session established at a time, for the purpose of preventing flapping and other effects. For example, if router 102B maintains a first session state for the first session with router 102A, then router 102B will continue to communicate with router 102A via the first communications session and will disregard any attempts to establish a second communications session with router 102A. In fact, router 102B may try to continue communicating with router 102A via the first communications session until the router 102B actually deletes the first session state for the first session, times out the first communications session with the router 102A, resets the first session settings, accepts a request to establish a new session, etc.

In an embodiment, router 102B receives a SYN segment 6B from router 102A in which the router 102A requests establishing a second communications session between the two routers. However, router 102B still maintains the first session state and attempts to communicate with the router 102A using the first communications session. Such attempts may continue for the entire configured timeout period, which may be several minutes.

In an embodiment, the method herein allows a faster restart of BGP sessions using TCP-AO the routers 102A, 102B after a cold reboot. In an embodiment, router 102B provides connectionless reset support for TCP-AO when router 102A was rebooted and is unable to communicate with router 102B using the first communications router.

Upon receiving from router 102A a SYN segment 6B as a request to establish a second communication session with router 102B, instead of ignoring the SYN segment 6B, the router 102B generates and sends a probe message 6D to router 102A. In an embodiment, the probe message 6D is secured with a first session set of keys as the router 102A still maintains a first session state and thus maintains the first session keys.

In an embodiment, the probe message 6D is sent to the router 102A to test whether the router 102A is responsive and whether the first communications session between the first router 102A and the second router 102B is still active.

In an embodiment, probe message 6D may comprise a TCP keep-alive message, as described for example in section 7.7 of RFC 5925. In some BGP implementations, TCP keep-alive messages cannot be used as probes due to limitations of the TCP stacks on traditional kernel-based operating systems. Other embodiments may use other forms of probes.

In an embodiment, the probe message 6D is a retransmission of a previously transmitted packet, a TCP probe packet comprising zero or one byte data segments, etc.

In an embodiment, probe message 6D is encrypted using a set of first session keys. Because router 102B maintains the first communications session state, the router 102B has the first session key.

In an embodiment, router 102A receives a probe message 6D that is secured with one or more first session keys. Upon receiving the probe message 6D the router 102A needs the first session keys to decrypt the probe message 6D. However, after a cold reboot the router 102A does not have the first session keys and cannot regenerate them.

In an embodiment, upon sending a probe message 6D, router 102B creates and starts a timer to measure a time interval during which the router 102B is awaiting a response from the router 102A to the probe message 6D. If the router 102B does not receive a response to the probe message upon the expiration of the timer, then the router 102B may determine that the first communications session with the router 102A has been terminated or that the router 102A is not responsive. In response, the router 102B may stop ignoring requests to establish a new communications session received from the router 102A and may respond to the requests from the router 102A to establish a new communications session.

In an embodiment, router 102B awaits a response to probe message 6D that the router sent to router 102A. The router 102B expects one of several types of responses. For example, router 102B may expect an acknowledgement of receiving the probe message 6D by router 102A. Such a response may be received by router 102B if the first communications session remains active and router 102A remains responsive. If router 102B receives the acknowledgement to the probe message 6D from router 102A, then router 102B can determine that the first session with router 102A is still active and that router 102A is still responsive. In such a situation, router 102B may ignore the SYN segment 6B, if such is received from router 102A, and continue communicating with router 102A via the first communications session.

However, in some situations, router 102B may not receive an acknowledgement that router 102A received the probe message 6D. For example, the probe message 6D cannot be acknowledged by router 102A if the first communications session has been for some reason terminated. That may happen if router 102A was rebooted before receiving the probe message 6D, router 102A was unable to decrypt the probe message, router 102A has not received the probe message, etc.

According to another example, the probe message 6D cannot be acknowledged by router 102A if router is non-responsive, and thus does not process the delivered communications and does not respond to the delivered communications. According to other example, the probe message 6D cannot be acknowledged by router 102A if router received the probe message 6D but cannot recognize (decrypt) the probe message because the probe message is secured with the first session keys and router 102A does not have the first session keys and cannot regenerate the first session keys.

In an embodiment, router 102B waits for a response to probe message 6D until the expiration of the timer described above. If during the waiting period (FIG. 2, element 9), router 102B receives a valid acknowledgement from router 102A that router 102A received the probe message 6D, then router 102B ignores a SYN 6B requests sent by router 102A to establish a second communications session between router 102A and router 102B.

However, if router 102B does not receive a valid acknowledgement form router 102A confirming that router 102A received a probe message 6D, then router 102B deletes the first session state (FIG. 2, element 3D).

Once router 102B deletes the first session state for the first communications session with router 102A, router 102B may be receptive to requests to establish a second communications session with router 102A. In particular, once the first session state for the first communications session with router 102A is deleted, router 102B may either receive requests establishing a new communications session with router 102A or respond to requests from router 102A to establish the new communications session with router 102A.

In an embodiment, after router 102B deleted the first session state for the first session with router 102A, router 102B receives a SYN segment 8A, retransmitted by router 102A. In the retransmitted SYN segment 8A, router 102A requests establishing a second communications session with router 102B. Sending (or retransmitting) the SYN segment 8A corresponds to the first step of the three-way handshake process described above.

A SYN segment 8A may be secured with a second session key that router 102A generated for the second session with router 102B. The second session keys may be generated using the master keys distributed to the router when the router is configured and using the session's information, such as a session identifier, etc., as described above for SYN segment 6B.

In an embodiment, upon receiving a SYN segment 8A, router 102B does not have any active session with router 102A. Thus, router 102B may respond to the SYN segment 8A with an SYN/ACK segment 8B. Sending the SYN/ACK segment 8B to router 102A completes the second step of the three-way-handshake process described above.

In response to receiving a SYN/ACK segment 8B from router 102B, router 102A may respond with an ACK segment 8C. Shortly after sending the ACK segment 8C to router 102B, router 102A establishes the second session state 11A.

In response to receiving an ACK segment 8C from router 102A, router 102B establishes the second session state 11B. Receiving the ACK segment 8C by router 102B completes the third step of the three-way-handshake TCP process.

Shortly after router 102A establishes a second session state 11A, router 102A starts communicating data with router 102B, and shortly after router 102B establishes the second session state 11B, router 102B starts communicating the data with router 102A.

Various embodiments may use different ways of measuring a time delay during which router 102A tries to establish a second communications session with router 102B after router 102A was rebooted. In an embodiment, the time delay is represented by a time interval that starts when router 102A makes a first attempt to send an RST message to router 102B to reset a first session even though such an attempt fails because router 102A does not have the valid first session keys. In an embodiment, the time delay ends when router 102A establishes the second session state.

In an embodiment depicted in FIG. 2, a time delay 10 represents a time interval during which router 102A tries to establish a second communications session with router 102B after router 102A was rebooted. The time delay 10 starts when router 102A makes a first attempt to send an RST 6A message to router 102B to reset a first session, and ends when router 102A establishes a second session state 11A.

According to another embodiment, time delay 10 is measured from the time that router 102A is rebooted (FIG. 2, element 4) to the time that router 102A sends an ACK segment 8C to router 102B.

According to another embodiment, time delay 10 is measured from the time that router 102A deleted the first session state (FIG. 2, element 3C) to the time that router 102A established the second session state 11A.

By implementing the probe approach herein, instead of ignoring the request to establish the second session with router 102A for a relatively long period of time, router 102B probes responsiveness of router 102A and the connectivity with router 102A. If either router 102A is non-responsive or the connection with router 102A is non-responsive, then router 102B cooperates with router 102A in attempts to establish the second communications session with router 102A.

FIG. 5 illustrates an embodiment of a connectionless reset approach corresponding to the process described in reference to FIG. 3. In an embodiment, the steps depicted in FIG. 5 may be performed by router 102B that is a peer of router 102A, which experienced a cold reboot after a first communications session have been established between the two routers.

In step 3B, router 102B cooperates with router 102A in establishing a first communications session. After the three-way-handshake process described above is completed, each of routers 102A, 102B establishes a first communications state associated with the first communications session.

In step 6B, router 102B tests whether a SYN segment to establish a second communications session was received from router 102A. If the SYN segment to establish the second communications session was received from router 102A, then the process proceeds to step 6D. Otherwise, router 102B continues communicating with router 102A via the first communications session and checks whether the SYN segment to establish the second communications session was received from router 102A.

In step 6D, router 102B generates a probe message to test whether router 102A is responsive and whether the first communications session with router 102A is still active. As described above, upon receiving a SYN segment, in which router 102A requests establishing a second communications session with router 102B, router 102B determines whether such a SYN segment was sent by a mistake or indeed the second communications session should be established with router 102A.

Because a TCP-AO BGP router may maintain only one active session state with another TCP-AO BGP router at a time, upon receiving the SYN segment from router 102A, router 102B may test ("probe") responsiveness of router 102A and the first communications connection.

In an embodiment, router 102A sends to router 102A a probe message secured with the first session keys since the first session keys are the only keys that router 102B has available to secure the messages with router 102A.

In step 6D, router 102B may also set a timer to measure a period during which router 102B expects to receive from router 102A a response to the probe message.

In step 9, router 102B determines whether the probe message sent to router 102A has been acknowledged by router 102A. If the probe message has not been acknowledged by router 102A, then router 102B proceeds to step 3D. Otherwise, router 102B continues waiting for an acknowledgement from router 102A that router 102A received the probe message and proceeds to step 9.

In embodiment, router 102B waits for receiving an acknowledgement from router 102A only for a predetermine period of time. For example, if router 102B has preset a timer associated with the probe message, then router 102B waits for receiving an acknowledgement from router 102 only until the timer expires. If upon the expiration of the timer router 102B has not received an acknowledgment to the probe message from router 102A, then router 102B proceeds to step 3D.

In step 3D, router 102B determines that either router 102A is non-responsive or the first communications session failed and deletes the first session state. Once router 102B deletes the first session state, router 102B is receptive to establishing a second communications session with router 102B.

In step 8A, router 102B awaits receiving a SYN segment from router 102A to establish a second communications session with router 102A. Router 102B may receive a retransmitted SYN segment that router 102A has already sent to router 102B, or a new SYN segment to establish the second communication session.

If the SYN segment is received, router 102B proceeds to step 11B. Otherwise router 102B continues listening for a request to establish a new session with router 102B and proceeds to step 8A.

In step 11B, router cooperates with router 102B in establishing a second communications session and once a three-way-handshake process is completed for the second communications session between the two routers, router 102B establishes a second communications session state. At this point, router 102B communicates with router 102A via the second communications session.

The process may be repeated for each current communications session between the two routers. Once any of the two routers experiences a cold reboot, the rebooted router may send a SYN segment to establish a new communications session with the peer. Upon receiving the SYN segment to establish the new communications session with the peer, router 102B sends a probe to the rebooted router, as indicated in step 6D, and the process continues from the step 6D as shown in FIG. 5.

4.0 Providing Connectionless Reset Support in a TCP-AO Network—Example

Referring now to FIG. 3, router 102A attempts to establish a first communications session with router 102B. Both routers 102A and 102B have been configured with long-term master keys that the routers can use to generate session keys for a particular communications session.

In an embodiment, BGP routers 102A and 102B have already used their "master keys" to generate a first set of keys for a first communications session.

In an embodiment, router 102A initiates a TCP three-way handshake to setup a first TCP-BGP session with router 102B. For purpose of illustrating clear examples, the description herein pertains to establishing a first communications session between routers 102A, 102B. However, the description may be extended to establishing any new communications session between routers 102A, 102B.

To establish a first session communications session, routers 102A, 102B execute a TCP three-way handshake process described above in reference to FIG. 2 using SYN segment 2A, SYN/ACK segment 2B, and ACK segment 2C.

In an embodiment, a SYN segment 2A is encrypted using a first set of keys, as it was described in reference to FIG. 2.

Upon sending the ACK segment 2C to router 102B, router 102A creates a session state for the first session established with router 102B. Creating the session state for the first session is completed shortly after router 102B sent the ACK segment 2C to router 102B, as it was indicated by element "First Session State Established" 3A in FIG. 2

Upon receiving an ACK segment 2C from router 102A, router 102B creates a session state for the first session established with router 102A. Creating the state for the first session is completed shortly after router 102B receives the ACK segment 2C from router 102A, as it is indicated by element "First Session State Established" 3B in FIG. 2

Once routers 102A, 102B established their respective first session states, routers 102A, 102B start exchanging data 2D.

In an embodiment, while the first communication session is in the established state, one of the routers is rebooted. For simplicity and for purposes of illustrating clear examples, FIG. 3 depicts a situation in which router 102A is rebooted.

In an embodiment, a reboot of router 102A is a cold reboot and the router 102A deletes the first session state that was associated with the first communications session.

In an embodiment, router 102A attempts to establish a second communications session with router 102B. Router 102A may dynamically generate a second set of keys from the master keys that were provided to router 102A during the router configuration phase. Generating the second set of keys is similar to generating a first set of keys described above.

In an embodiment, router 102A sends a TCP SYN segment 6B encrypted with the second session keys to router 102B. The TCP SYN segment 6B is a request made by router 102A to establish a second communications session with router 102B.

Upon receiving a TCP SYN segment 6B, router 102B attempts to process the message, which is a request to establish a second communications session. However, if router 102B still has first state information for a first session previously established with router 102A, then router 102B cannot accept the request.

In an embodiment, router 102B receives a SYN segment 6B from router 102A in which router 102A requests establishing a second communications session between router 102A and router 102B. However, router 102B still maintains the first session state and tries to communicate with router 102A via the first communications session.

Upon receiving from router 102A a SYN segment 6B to establish a second communication session with router 102B, instead of ignoring the SYN segment 6B, router 102B stores the SYN segment 6B. Furthermore, router 102B generates and sends a probe message 6D to router 102A.

In an embodiment, probe message 6D is secured with a first session set of keys as router 102A still maintains a first session state and thus maintains the first session keys.

In an embodiment, probe message 6D is sent to router 102A to test whether router 102A is responsive and whether the first communications session between the router 102A and router 102B is active.

In an embodiment, upon sending probe message 6D, router 102B starts a timer to measure an interval during which router 102B is awaiting a response from router 102A to the probe message 6D. If router 102B does not receive a response from router 102A to the probe message 6D, then router 102B may determine that the first communications session with router 102A for some reason has been terminated or that router 102A is not responsive (or both). Subsequently, router 102B may stop ignoring request to establish a new communications session with router 102A and establish the new communications session with router 102A.

If router 102B receives an acknowledgement to a probe message 6D from router 102A, then router 102B can conclude that the first session with router 102A is still active and that router 102A is still responsive. Therefore, router 102B may ignore the SYN segment 6B from router 102A and continue communicating with router 102A via the first communications session.

However, in some situations, router 102B may not receive an acknowledgement that router 102A received the probe message 6D. For example, the probe message 6D cannot be acknowledged by router 102A if the first communications session has been for some reason terminated and router 102A has not received the probe message 6D. According to another example, the probe message 6D cannot be acknowledged by router 102A if router 102A is non-responsive, and thus cannot respond to the probe message 6D. According to other example, the probe message 6D cannot be acknowledged by router 102A if router 102A received the probe message 6D but cannot recognize (decrypt) the probe message 6D because the probe message 6D is secured with the first session keys and router 102A does not have the first session keys and cannot regenerated the first session keys.

In an embodiment, router 102B waits for a response to the probe message 6D until the expiration of a timer described above. If during the waiting period (FIG. 2, element 9), router 102B receives a valid acknowledgement from router 102A that router 102A received the probe message 6D, then router 102B ignores the SYN 6B requests to establish a second communications session with router 102A.

However, if router 102B does not receive a valid acknowledgement form router 102A that router 102A received a probe message 6D, then router 102B deletes the first session state (FIG. 2, element 3D).

Once router 102B deletes the first session state for the first communications session with router 102A, router 102B may retrieve the saved SYN segment 6B.

In an embodiment, a SYN segment 6B may be secured with a first session key that router 102A generated for the first session to be established with router 102B. However, if router 102B stored the SYN segment 6B when router 102B still had the first session state information, then router 102B router could have decrypted the SYN segment 6B as a decrypted request from router 102A to establish a second communications session with router 102B.

In an embodiment, upon retrieving the SYN segment 6B, router 102B does not have any active session with router 102A. Thus, router 102B may respond to the SYN segment 6B with an SYN/ACK segment 8B. Sending the SYN/ACK segment 8B to router 102A completes the second step of the three-way-handshake process described above.

In response to receiving a SYN/ACK segment 8B from router 102B, router 102A may respond with an ACK segment 8C. Shortly after sending the ACK segment 8C to router 102B, router 102A establishes a second session state 11A.

In response to receiving an ACK segment 8C from router 102A, router 102B establishes a second session state 11B. Receiving the ACK 8C by router 102B completes the third step of the three-way-handshake TCP process.

Shortly after router 102A establishes the second session state 11A, router 102A starts communicating data with router 102B, and shortly after router 102B establishes the second session state 11B, router 102B starts communicating the data with router 102A.

In an embodiment depicted in FIG. 3, a time delay 10 represents an interval during which router 102A tries to establish a second communications session with router 102B after router 102A was rebooted. In an embodiment, the time delay 10 starts when router 102A makes a first attempt to send an RST segment 6A to router 102B to reset a first session even though such an attempt fails because router 102A does not have the valid first session keys. The time delay ends when router 102A establishes a second session state 11A.

According to another embodiment, the time delay 10 is measured from the moment router 102A is rebooted (FIG. 3, element 4) to time when router 102A sends an ACK segment 8C to router 102B.

According to other embodiment, the time delay 10 is measured from the moment router 102A deleted a first session state (FIG. 3, element 3C) to the moment that router 102A established a second session state 11A.

FIG. 6 illustrates an embodiment of a connectionless reset support corresponding to the process described in reference to FIG. 3. In an embodiment, the steps described in FIG. 6 are performed by router 102B, which is a peer of router 102A that experienced a cold reboot after a first session between the two routers was established.

In step 3B, router 102B cooperates with router 102A in establishing a first communications session. After the three-way-handshake process described in detail above is completed, each of routers 102A, 102B establishes a first communications state associated with the first communications session.

In step 6B, router 102B tests whether a SYN segment to establish a second communications session was received from router 102A. If the SYN segment to establish the second communications session was received from router 102A, then router 102B stores the SYN segment and the process proceeds to step 6D. Otherwise, router 102B continues communicating with router 102A via the first communications session and checks whether the SYN segment to establish the second communications session was received from router 102A.

If router 102B received a SYN segment from router 102A, then router 102B may test whether the message is decrypted with the first session keys. In response to determining that the SYN segment is decrypted with the first session keys, router 102B decrypts the SYN segment and stores the decrypted SYN segment as a request to establish a second communications session with router 102A. Otherwise, router 102B stores the encrypted SYN segment for further processing.

In step 6D, router 102B generates a probe message to test whether router 102A is responsive and whether the first communications session with router 102A is still active. As described above, upon receiving the SYN segment in which router 102A requests establishing a second communications session with router 102B, router 102B wants to determine whether such a SYN segment was sent by a mistake or indeed the second communications session should be established with router 102A.

Because a TCP-AO BGP router may maintain only one active session state with another TCP-AO BGP router at a time, upon receiving the SYN segment from router 102A, router 102B may test responsiveness of router 102A and the first communications connection.

In an embodiment, router 102A sends to router 102A a probe message secured with the first session keys since the first session keys are the only keys that router 102B may use to secure the messages with router 102A.

In step 6D, router 102B may set a timer to measure a period during which router 102B expects to receive from router 102A a response to the probe message.

In step 9, router 102B determines whether the probe message sent to router 102A has been acknowledged by router 102A. If the probe message has not been acknowledged by router 102A, then router 102B proceeds to step 3D. Otherwise, router 102B continues waiting for an acknowledgement from router 102A that router 102A received the probe message and proceeds to step 9.

In embodiment, router 102B waits for an acknowledgement from router 102A only for a specified period of time. For example, if router 102B has preset a timer associated with the probe message, then router 102B waits for receiving an acknowledgement from router 102 only until the timer expires. If upon the expiration of the timer router 102B has not received the probe acknowledgment from router 102A, then router 102B proceeds to step 3D.

In step 3D, router 102B determines that either router 102A is non-responsive or the first communications session failed (or both) and deletes the first session state. Therefore, in step 3D, router 102B deletes the first session information and is receptive to establishing a second communications session with router 102B.

In an embodiment, router 102B retrieves the stored SYN segment. The SYN segment may be stored at router 102B as a decrypted SYN segment if router 102A sent the SYN segment encrypted with the first session keys.

In an embodiment, the SYN segment is encrypted with a second session key. Router 102B retrieves the encrypted SYN segment, generates the second session keys from the master keys, as described above, and decrypts the SYN segment. The decrypted SYN segment is a request to establish the second communications session with router 102A.

In step 11B, router cooperates with router 102B in establishing a second communications session and once a three-way-handshake process is completed for the second communications session between the two routers, router 102B establishes a second communications session state. At this point, router 102B communicates with router 102A via the second communications session.

The process may be repeated for each current communications session between the two routers. Once any of the two routers experiences a cold reboot, the rebooted router may send a SYN segment to establish a new communications session with the peer. Upon receiving the SYN segment to establish the new communications session with the peer, router 102B sends a probe to the rebooted router (BGP router 10A), as indicated in step 6D, and the process continues from the step 6D as it is depicted in FIG. 6.

The approach depicted in FIG. 3 and FIG. 6 is similar to the approach depicted in FIG. 2 and FIG. 5, except that the approach in FIG. 3 and FIG. 6 allows router 102B to store the first SYN segment 6B when router 102B is not ready to establish a second communications session with router 102A.

In an embodiment, the approaches depicted in FIG. 2, FIG. 5 and FIG. 3, FIG. 6 may be considered as approaches in which router 102B is considered to be "optimistic" as to viability of the first communications session with router 102A. According to the approaches depicted in FIG. 2, FIG. 5 and FIG. 3, FIG. 6, router 102B gives router 102A a last chance to confirm that the first communications session with router 102B is still valid before router 102B tears down the first session state and gives up on the first communications session with router 102A.

In an embodiment, the approaches depicted in FIGS. 2,5 and 3,6 assume that router 102A has not failed even if a SYN segment to establish a new session with router 102A and router 102B was received by router 102B.

5.0 Providing Connectionless Reset Support in a TCP-AO Network—Example

Referring now to FIG. 4, router 102A attempts to establish a first communications session with router 102B. Both routers 102A and 102B are BGP routers configured to implement TCP-AO, described above. Therefore, both routers 102A and 102B have been already configured with long-term master keys that the routers can use to generate session keys for a particular communications session.

In an embodiment, BGP routers 102A and 102B have already used their master keys to generate a first set of keys for a first communications session.

In an embodiment, router 102A initiates a TCP three-way handshake to setup a first TCP-BGP session with router 102B. For purpose of illustrating clear examples, the description pertains to establishing the first communications session between routers 102A, 102B. However, the description may be extended to establishing any new communications session between routers 102A, 102B.

To establish a first session communications session, routers 102A, 102B execute the TCP three-way handshake process, as described above in reference to FIG. 2 and using SYN segment 2A, SYN/ACK segment 2B, and ACK segment 2C, after which session state data is created and one of the routers is cold rebooted, resulting in deletion of the session state data. For simplicity and for purposes of illustrating clear examples, FIG. 4 depicts a situation in which router 102A is rebooted.

In an embodiment, router 102A attempts to establish a second communications session with router 102B. Router 102A may dynamically generate a second set of keys from the master keys that were provided to router 102A during the router configuration phase. Generating the second set of keys is similar to generating a first set of keys described above.

In an embodiment, router 102A sends a TCP SYN segment 6B encrypted with the second session keys to router 102B. The TCP SYN segment 6B is a request made by router 102A to establish a second communications session with router 102B.

Upon receiving the TCP SYN segment 6B message, router 102B attempts to process the request to establish the second communications session. However, if router 102B still has first state information for the first session previously established with router 102A, then router 102B cannot accept the request.

Nevertheless, upon receiving from router 102A a SYN 6B request to establish a second communication session with router 102B, instead of ignoring the SYN segment 6B request, router 102B stores the SYN segment 6B.

In an embodiment, router 102B assumes that router 102A probably failed. Therefore, router 102B generates and sends to router 102A a SYN/ACK segment as the second step of the three-step TCP handshake process to establish a second communications session between router 102A and router 102B.

In an embodiment, shortly before sending an SYN/ACK segment to router 102A, router 102B generates and sends a probe message 6D to router 102A. In an embodiment, the probe message 6D is secured with a first session set of keys as router 102A still maintains a first session state and thus maintains the first session keys.

In an embodiment, a probe message 6D is sent to router 102A to test (to "probe") whether router 102A is responsive and whether the first communications session between the first BGP router 102A and router 102B is still active.

In an embodiment, upon sending a probe message 6D, router 102B sets up a timer to measure an interval during which router 102B is awaiting a response from router 102A to the probe message 6D. If router 102B does not receive any response from router 102A to the probe message, then router 102B may determine that the first communications session with router 102A for some reason has been terminated or that router 102A is not responsive.

If router 102B receives an acknowledgement to a probe message 6D from router 102A, then router 102B can conclude that a first session with router 102A is still active and that router 102A is still responsive. Therefore, router 102B may forgo attempts to establish a second communications session with router 102A and continue communicating with router 102A via the first communications session.

However, in some situations, router 102B may not receive an acknowledgement that router 102A received the probe message 6D. For example, the probe message 6D cannot be acknowledged by router 102A if the first communications session has been for some reason terminated or router 102A has not received the probe message 6D. According to another example, the probe message 6D cannot be acknowledged by router 102A if router 102A is non-responsive, and thus cannot process the probe message. According to other example, the probe message 6D cannot be acknowledged by router 102A if router 102A received the probe message 6D but cannot recognize (decrypt) the probe message 6D because the probe message 6D is secured with the first session keys and router 102A does not have the first session keys and cannot regenerated the first session keys.

In an embodiment, router 102B waits for a response to the probe message 6D until the expiration of the timer. If during the waiting period (FIG. 4, element 9), router 102B receives a valid acknowledgement from router 102A that router 102A received the probe message 6D, then router 102B ignores the SYN segment 6B to establish a second communications session with router 102A.

However, if router 102B does not receive a valid acknowledgement form router 102A that router 102A received the probe message 6D, then router 102B deletes the first session state (FIG. 2, element 3D).

Once router 102B deletes a first session state for a first communications session with router 102A, router 102B may be receptive to receive an ACK segment 8C from router 102A.

In response to receiving an ACK segment 8C from router 102A, router 102B establishes a second session state 11B. Receiving the ACK segment 8C by router 102B completes the third step of the three-way TCP handshake.

In FIG. 4, time delay 10 represents an interval during which router 102A tries to establish a second communications session with router 102B after router 102A was rebooted and starts when router 102A makes a first attempt to send an RST segment 6A to router 102B to reset a first session, and ends when router 102A establishes second session state 11A.

According to another embodiment, time delay 10 is measured from when router 102A is rebooted (FIG. 4, element 4) to the time when router 102A sends an ACK segment 8C to router 102B.

According to other embodiment, time delay 10 is measured from the time when router 102A deleted the first session state (FIG. 4, element 3C) to the time when router 102A established second session state 11A.

FIG. 7 illustrates an embodiment of a connectionless reset support corresponding to the process described in reference to FIG. 4. In an embodiment, the steps described in FIG. 7 are performed by router 102B, which is a peer of router 102A that experienced a cold reboot after a first session between the two routers was established.

In step 3B, router 102B cooperates with router 102A in establishing a first communications session. After the three-way-handshake process is completed, each of routers 102A, 102B establishes a first communications state associated with the first communications session.

In step 6B, router 102B tests whether a SYN segment to establish a second communications session was received from router 102A. If the SYN segment to establish the second communications session was received from router 102A, then router 102B stores the SYN segment and the process proceeds to step 6D. Otherwise, router 102B continues communicating with router 102A via the first communications session and checks whether the SYN segment to establish the second communications session was received from router 102A.

If router 102B received a SYN segment from router 102A, then router 102B may test whether the message is decrypted with the first session keys. In response to determining that the SYN segment is decrypted with the first session keys, router 102B decrypts the SYN segment and stores the decrypted SYN segment as a request to establish a second communications session with router 102A. Otherwise, router 102B stores the encrypted SYN segment for further processing.

In step 6D, router 102B generates a probe message to test whether router 102A is responsive and whether the first communications session with router 102A is still active. As described above, upon receiving the SYN segment in which router 102A requests establishing a second communications session with router 102B, router 102B wants to determine whether such a SYN segment was sent by a mistake or indeed the second communications session should be established with router 102A.

In an embodiment, router 102A sends to router 102A a probe message secured with the first session keys.

In step 6D, router 102B may also set a timer to measure a period during which router 102B expects to receive from router 102A a response to the probe message.

In step 8B, router 102B sends a SYN/ACK segment to router 102A assuming that router 102A probably failed, and thus the likelihood of maintaining a first communications session with router 102A is small. By sending the SYN/ACK segment to router 102A almost simultaneously with sending a probe message to router 102A, router 102B attempts to minimize the time period during which router 102B cannot exchange data with router 102A.

In step 9, router 102B determines whether the probe message sent to router 102A has been acknowledged by router 102A. If the probe message has not been acknowledged by router 102A, then router 102B proceeds to step 3D. Otherwise, router 102B continues waiting for an acknowledgement from router 102A that router 102A received the probe message and proceeds to step 9.

In embodiment, router 102B waits for receiving an acknowledgement from router 102A only for a specified period of time. For example, if router 102B has preset a timer associated with the probe message, then router 102B waits for receiving an acknowledgement from router 102 until the timer expires. If upon the expiration of the timer router 102B has not received the probe acknowledgment from router 102A, then router 102B proceeds to step 3D.

In step 3D, router 102B determines that either router 102A is non-responsive or the first communications session failed (or both) and deletes the first session state. Therefore, in step 3D, router 102B deletes the first session state and is receptive to establishing a second communications session with router 102B.

In step 3D, router 102B awaits receiving an ACK segment from router 102A. If the ACK segment has been delivered from router 102A to router 102B, then router 102B becomes receptive to the ACK segment, receives the ACK segment and completes the three-way-handshake process of establishing a second communications session with router 102A. At this point, router 102B communicates with router 102A via the second communications session.

The process may be repeated for each current communications session between the two routers. Once any of the two routers experiences a cold reboot, the rebooted router may send a SYN segment to establish a new communications session with the peer. Upon receiving the SYN segment to establish the new communications session with the peer, router 102B sends a probe to the rebooted router (BGP router 102A), as indicated in step 6D, and the process continues from the step 6D as shown in FIG. 6.

The approach depicted in FIG. 4 and FIG. 7 is similar to the approach depicted in FIG. 3 and FIG. 6 in the sense that both approaches save a SYN segment 6B to establish a second communications session between routers 102A, 102B after router 102A was rebooted and thus has no first state information. However, the approach depicted in FIG. 4 and FIG. 7 allows router 102B to send a SYN/ACK segment to router 102A almost immediately after router 102B received a SYN segment from router 102A to establish a second communications session with router 102A, while the approach depicted in FIG. 3 and FIG. 6 allows router 102B to send the SYN/ACK after the probe timer expires.

In an embodiment, while the approaches depicted in FIG. 2, FIG. 5 and FIG. 3, FIG. 6 may be considered as "optimistic" approaches with regard to viability of the first communications session with router 102A, the approach depicted in FIG. 4 and FIG. 7 may be considered as a "pessimistic" approach with regard to viability of the first communications session. According to the approach depicted in FIG. 4 and FIG. 7, upon receiving a SYN segment from router 102A, router 102B assumes that the first session with router 102A has failed, and router 102B tries to establish a second communications session with router 102A as soon as a SYN segment to establish the second communications session with router 102A is received by router 102B.

In an embodiment, the approach depicted in FIG. 4 and FIG. 7 assumes that router 102A has failed or a first communications session has been terminated, and that a SYN segment to establish a new session with router 102A was indeed sent from router 102A as a request to establish the second communications session with router 102A.

6.0 Network Congestion Benefits

The long session timeout period, used in prior approaches for a peer router that had established a first communications session with a rebooted router to delete a first session state, arises when the rebooted router keeps retransmitting requests to establish a second communications session but the retransmissions are ignored by the peer router. The retransmissions often have an exponential back-off period, which may cause increased network congestion due to the number of the retransmissions.

In contrast, the approaches described herein do not congest a network to the same degree as the retransmission messages of a SYN segment. Each of the unacknowledged SYN segments described above may have several re-transmissions. The approaches herein allow reducing the number of retransmission or even omit the necessity for retransmissions.

7.0 Security Considerations

In an embodiment, the probe-approach for the connection-less reset support in a TCP-AO network may protect networks from "man-in-the-middle" attacks.

The approaches described herein may prevent interference with security of the network, based on use of the probe messages.

Figure 8:
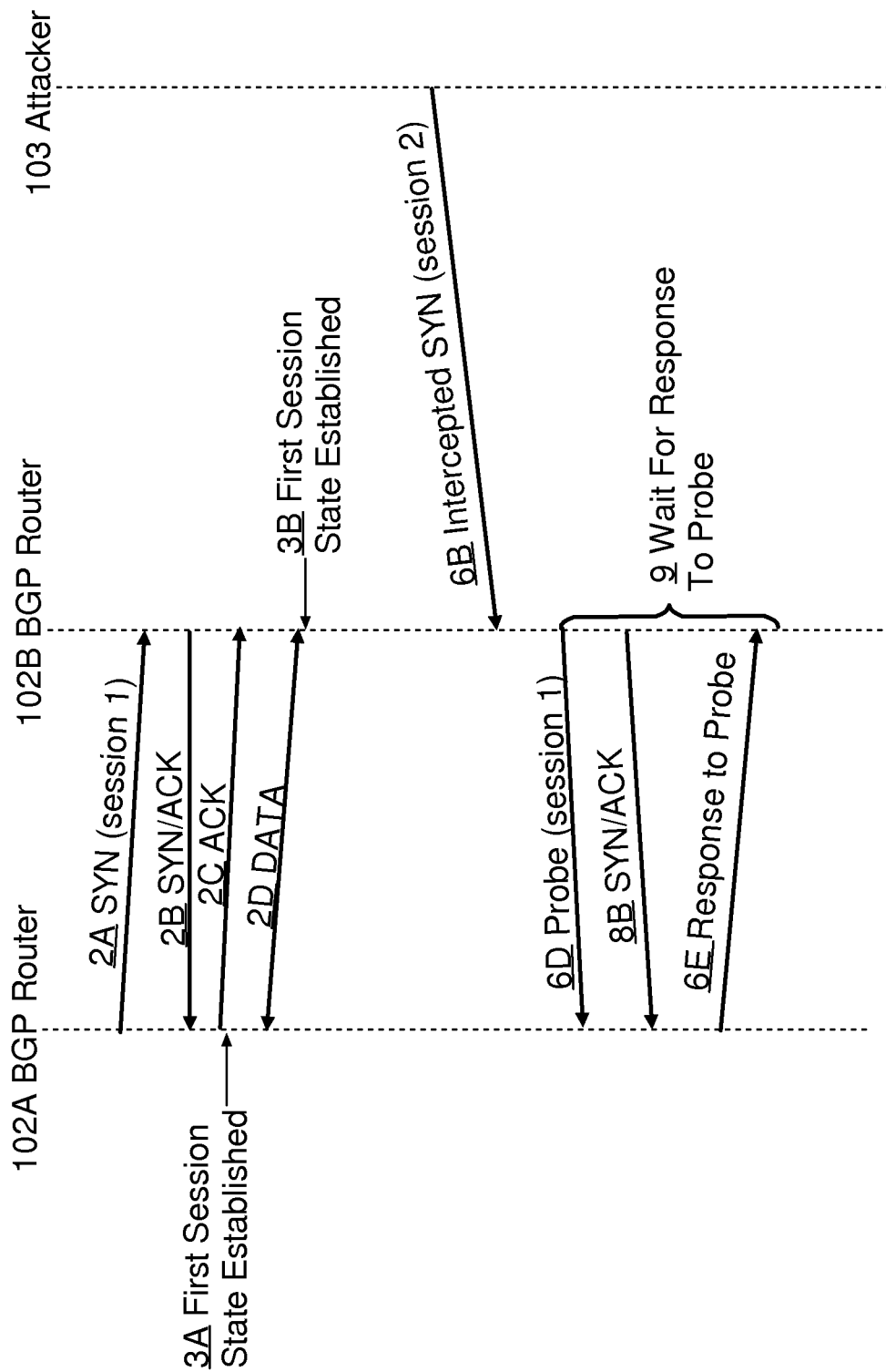
FIG. 8 illustrates an embodiment of communications between routers and an attacker.

FIG. 8 illustrates an embodiment of communications between two BGP routers 102A, 102B and an attacker 103. In an embodiment, routers 102A and 102B have established a secure first communications session by exchanging SYN segment 2A, SYN/ACK segment 2B, ACK segment 2C and data 2D, as described above for FIG. 2, FIG. 3 and FIG. 4. Router 102A has established a first session state 3A and router 102B has established a first session state 3B for the first communications session.

Assume that an attacker 103 has intercepted a SYN segment 6B and sent the SYN segment 6B to router 102B requesting establishing a second communications session with router 102B.

In an embodiment, the intercepted SYN segment 6B is encrypted with a second session keys that the attacker 103 either intercepted or generated from intercepted master keys.

In an embodiment, router 102B implements TCP-AO and thus the session established with router 102B are secured sessions.

Upon receiving a SYN segment 6B, router 102B assumes that the SYN segment 6B was received from router 102A, and thus, router 102B tries to determine whether router 102A was rebooted or a first session with router 102A for some reason has failed. Therefore, the NBGP router 102B sends a probe message 6D to router 102A to test whether router 102A is responsive and whether the first communications session with router 102A is still active.

In an embodiment, a probe message 6D is encrypted with the first session keys. Upon receiving the probe message 6D, router 102A could decrypt the probe message 6D only if router 102A still has the first session keys or at least has the first session state information so it can regenerate the first session keys.

However, even if the probe message 6D is intercepted by an attacker 103, the attacker does not have the first session keys, and thus cannot decrypt the probe message 6D and cannot respond to the probe message 6D.

In an embodiment, simultaneously with sending a probe message 6D to router 102A, or shortly after sending the probe message 6D, router 102B sends a SYN/ACK segment 8B assuming that router 102A has most likely been rebooted and that a first session that had been established with router 102A has been terminated.

In an embodiment, a SYN/ACK segment 8B is encrypted with a second session key.

Since the SYN segment 6B was a fake request to establish a second communications session between routers 102A, 102B and was sent by an attacker who attempted to induce establishing the second communications session, router 102A has no reason to assume that establishing the second communications session was requested. In fact, router 102A still has a first session state, the first session keys and is communicating with router 102B via the first communications session.

Therefore, in response to receiving a probe 6D message, router 102A decrypts the probe message using the first session keys and responds to the probe message by indicating that router 102A is responsive and that the first communications session is still active.

In an embodiment, router 102A responds to the probe message 6D with a response 6E to the probe before a probe timer set by router 102B expires.

In an embodiment, upon receiving a response 6E to the probe from router 102A, router 102B ignores the SYN segment 6B request to establish a second communications session with router 102A. Hence, the second communications session is not going to be established between routers 102A, 102B in response to a fake SYN segment 6B sent by an attacker 103 because the probe mechanism implemented between routers 102A, 102B will prevent establishing such a session.

The approaches herein also may improve network security even if a "man-in-the-middle" attack retransmits an earlier probe. If router 102A has performed a cold reboot, router 102A cannot process the TCP-AO option in the segment and will discard the probe without attempting to perform any time-consuming processing. If router 102A has not cold booted and does have TCP-AO state data, then router 102A will drop the TCP segment once it recognizes it to be a retransmission. Therefore, the probe messages defined herein do not introduce any new attacks.

The approaches herein also prevent a man-in-the-middle attacker from receiving a response to a fake TCP probe initiated by the attacker. If router 102A has not experienced a cold reboot, router 102A will not be able to acknowledge the probe from an attacker 103. The router 102B would interpret the probe as indicating that router 102A has lost its TCP-AO state. However, the genuine probe is only sent in response to a TCP SYN segment sent from router 102A, so the attacker 103 would also need to replay an old TCP SYN segment with a correct TCP-AO option.

In an embodiment, BGP routers 102A, 102B are configured for protection against a TCP SYN segment attack. This can be accomplished by filtering TCP segments from IP addresses that are not known neighbors, and rate-limiting the acceptance of TCP SYN segments from known neighbors.

8.0 Implementation Mechanisms—Hardware Overview

Figure 9:
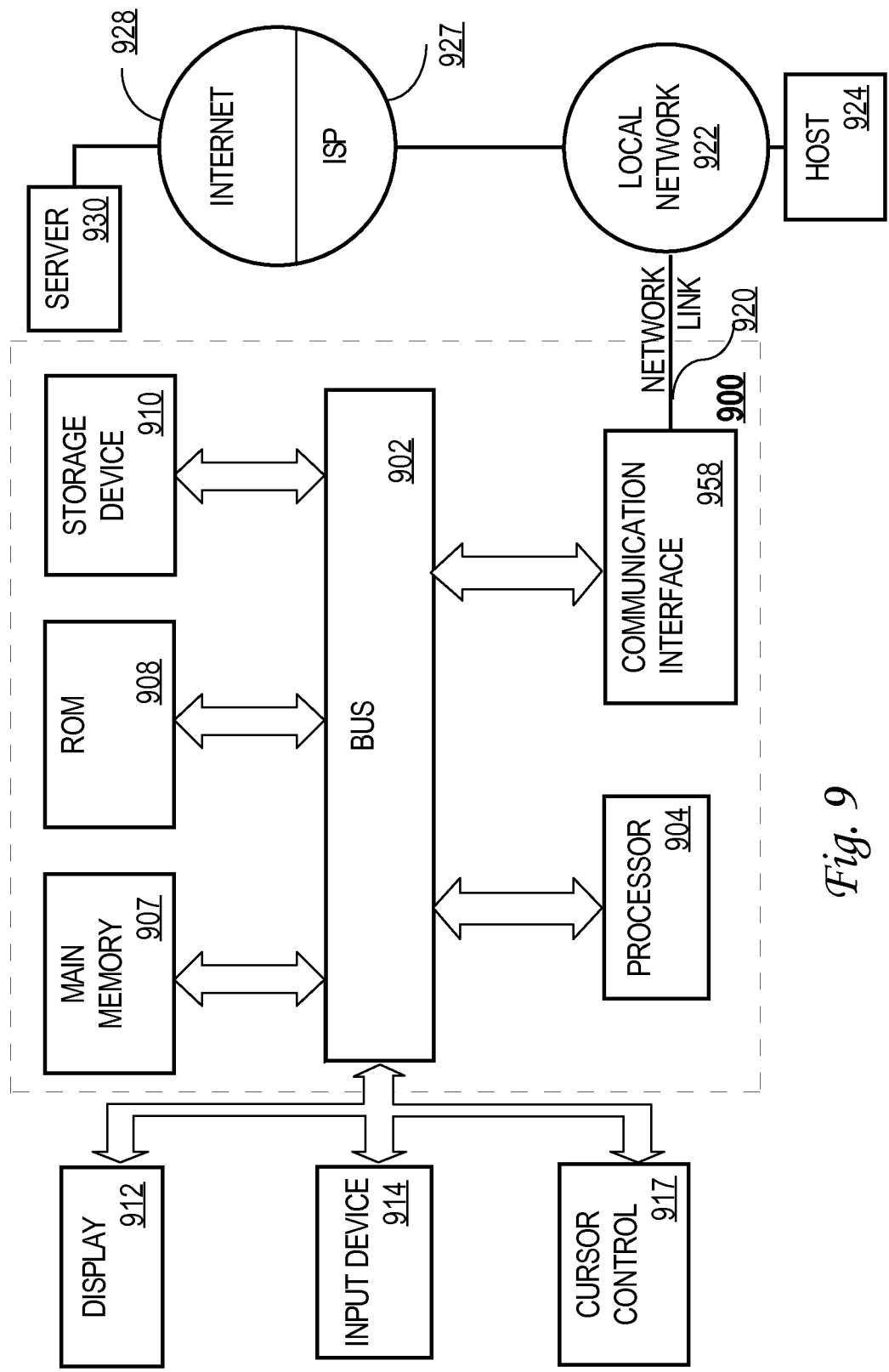
FIG. 9 illustrates a computer system upon which an embodiment may be implemented.

FIG. 9 is a block diagram that illustrates a computer system 900 upon which an embodiment of the invention may be implemented. The preferred embodiment is implemented using one or more computer programs running on a network element such as a router device. Thus, in this embodiment, the computer system 900 is a router.

Computer system 900 includes a bus 902 or other communication mechanism for communicating information, and a processor 904 coupled with bus 902 for processing information. Computer system 900 also includes a main memory 906, such as a random access memory (RAM), flash memory, or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk, flash memory or optical disk, is provided and coupled to bus 902 for storing information and instructions.

A communication interface 918 may be coupled to bus 902 for communicating information and command selections to processor 904. Interface 918 is a conventional serial interface such as an RS-232 or RS-422 interface. An external terminal 912 or other computer system connects to the computer system 900 and provides commands to it using the interface 918. Firmware or software running in the computer system 900 provides a terminal interface or character-based command interface so that external commands can be given to the computer system.

A switching system 916 is coupled to bus 902 and has an input interface 914 and an output interface 919 to one or more external network elements. The external network elements may include a local network 922 coupled to one or more hosts 924, or a global network such as Internet 928 having one or more servers 930. The switching system 916 switches information traffic arriving on input interface 914 to output interface 919 according to pre-determined protocols and conventions that are well known. For example, switching system 916, in cooperation with processor 904, can determine a destination of a packet of data arriving on input interface 914 and send it to the correct destination using output interface 919. The destinations may include host 924, server 930, other end stations, or other routing and switching devices in local network 922 or Internet 928.

According to one embodiment, compliance management is provided by computer system 900 in response to processor 904 executing one or more sequences of one or more instructions contained in main memory 906. Such instructions may be read into main memory 906 from another computer-readable storage medium, such as storage device 910. Execution of the sequences of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any medium that participates in providing instructions to processor 904 for execution. Such a medium may take many forms, including but not limited to, non-transitory and non-volatile storage media and non-transitory volatile storage media. Non-volatile storage media includes, for example, optical or magnetic disks, such as storage device 910. Volatile storage media includes dynamic memory, such as main memory 906.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other non-transitory, tangible storage medium from which a computer can read.

Various forms of computer readable storage media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Communication interface 918 also provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for compliance management as described herein. The received code may be executed by processor 904 as it is received, and/or stored in storage device 910, or other non-volatile storage for later execution.

9.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method, comprising:
   establishing a first data communications session between a first router and a second router;
   after a reboot, a reset, or unavailability of the first router, receiving from the first router a first request to establish a second data communications session between the first router and the second router;
   in response to receiving from the first router the first request to establish the second data communications session between the first router and the second router, the second router sending to the first router a probe message that is configured to test whether the first data communications session is responsive;
   only in response to determining that the first router has not acknowledged the probe message before a probe timer has expired and receiving from the first router a retransmission of the first request to establish the second data communications session with the first router, the second router establishing the second data communications session with the first router and deleting a state for the first data communications session;
   wherein the method is performed by one or more processors.

2. The method of claim 1, wherein the first data communications session and the second data communications session are secured sessions; a first set of keys is used in the first data communications session; a second set of keys is used in the second data communications session; the probe message is secured with the first set of keys.

3. The method of claim 1, wherein the first router is a Border Gateway Protocol (BGP) router; the first data communications session and the second data communications session are Transmission Control Protocol (TCP) sessions; the first data communications session and the second data communications session support a Transmission Control Protocol Authentication Option (TCP-AO).

4. The method of claim 1, wherein the probe message is any of a BGP keepalive message, a retransmission packet of a previously transmitted packet to the first router, or a TCP probe segment.

5. The method of claim 1, further comprising continuing to accept first session data in response to determining that the first router acknowledged the probe message before the probe timer has expired.

6. A network routing apparatus, comprising:
one or more processors;
a non-transitory computer-readable storage medium storing one or more sequences of instructions which, when executed by the one or more processors, cause the processors to perform:
establishing a first data communications session between a first router and a second router;
after a reboot, a reset, or unavailability of the first router, receiving from the first router a first request to establish a second data communications session between the first router and the second router;
in response to receiving from the first router the first request to establish the second data communications session between the first router and the second router, the second router sending to the first router a probe message that is configured to test whether the first data communications session is responsive;
only in response to determining that the first router has not acknowledged the probe message before a probe timer has expired and receiving from the first router a retransmission of the first request to establish the second data communications session, the second router establishing the second data communications session with the first router and deleting a state for the first data communications session.

7. The network routing apparatus of claim 6, wherein the first data communications session and the second data communications session are secured sessions; a first set of keys is used in the first data communications session, a second set of keys is used in the second data communications session; the probe message is secured with the first set of keys.

8. The network routing apparatus of claim 6, wherein the first router is a Border Gateway Protocol (BGP) router; the first data communications session and the first data communications session are Transmission Control Protocol (TCP) sessions; the first data communications session and the second data communications session support a Transmission Control Protocol Authentication Option (TCP-AO).

9. The network routing apparatus of claim 6, wherein the probe message is any of a BGP keepalive message, a retransmission packet of a previously transmitted packet to the first router, or a TCP probe segment.

10. The network routing apparatus of claim 6, wherein the non-transitory computer-readable storage medium further comprises instructions which, when executed by the one or more processors, cause the processors to perform continuing to accept first session data in response to determining that the first router acknowledged the probe message before the probe timer has expired.

11. A non-transitory computer-readable storage medium storing one or more sequences of instructions which, when executed by one or more processors, cause the processors to perform:
establishing a first data communications session between a first router and a second router;
after a reboot, a reset, or unavailability of the first router, receiving from the first router a first request to establish a second data communications session between the first router and the second router;
in response to receiving from the first router the first request to establish the second data communications session between the first router and the second router, the second router, sending to the first router a probe message that is configured to test whether the first data communications session is responsive;
only in response to determining that the first router has not acknowledged the probe message before a probe timer has expired and receiving from the first router a retransmission of the first request to establish the second data communications session with the first router, the second router establishing the second data communications session with the first router and deleting a state for the first data communications session.

12. The non-transitory computer-readable storage medium of claim 11, wherein the first data communications session and the second data communications session are secured sessions; a first set of keys is used in the first data communications session; a second set of keys is used in the second data communications session; the probe message is secured with the first set of keys.

13. The non-transitory computer-readable storage medium of claim 11, wherein the first router is a Border Gateway Protocol (BGP) router; the first data communications session and the second data communications session are Transmission Control Protocol (TCP) sessions; the first data communications session and the second data communications session support a Transmission Control Protocol Authentication Option (TCP-AO).

14. The non-transitory computer-readable storage medium of claim 11, wherein the probe message is any of a BGP keepalive message, a retransmission packet of a previously transmitted packet to the first router, or a TCP probe segment.

15. The non-transitory computer-readable storage medium of claim 11, further comprising instructions which, when executed by the one or more processors, cause the processors to perform continuing to accept first session data in response to determining that the first router acknowledged the probe message before the probe timer has expired.

16. A method, comprising:
establishing a first data communications session between a first router and a second router;
after a reboot, a reset, or unavailability of the first router, receiving from the first router a first request to establish a second data communications session between the first router and the second router;
in response to receiving from the first router the first request to establish the second data communications session between the first router and the second router, the second router sending to the first router a probe message that is configured to test whether the first data communications session is responsive;
only in response to determining that the first router has not acknowledged the probe message before a probe timer has expired, the second router establishing the second data communications session with the first router and deleting a state for the first data communications session;
wherein the method is performed by one or more processors.

17. The method of claim 16, wherein the first data communications session and the second data communications session are secured sessions; a first set of keys is used in the first data communications session; a second set of keys is used in the second data communications session; the probe message is secured with the first set of keys; the first router is a Border Gateway Protocol (BGP) router; the first data communications session and the second data communications session are Transmission Control Protocol (TCP) sessions; the first data communications session and the second data communications session support a Transmission Control Protocol Authentication Option (TCP-AO).

18. The method of claim 16, wherein the probe message is any of a BGP keepalive message, a retransmission packet of a previously transmitted packet to the first router, or a TCP probe segment.

19. A method, comprising:
  establishing a first data communications session between a first router and a second router;
  after a reboot, a reset, or unavailability of the first router, receiving from the first router a first request to establish a second data communications session between the first router and the second router;
  in response to receiving from the first router the first request to establish the second data communications session between the first router and the second router, the second router sending to the first router a probe message that is configured to test whether the first data communications session is responsive, and acknowledging receiving the first request to establish the second data communications session with the first router;
  only in response to determining that the first router has not acknowledged the probe message before a probe timer has expired, the second router establishing the second data communications session with the first router and deleting a state for the first data communications session;
  wherein the method is performed by one or more processors.

20. The method of claim 19, wherein the first data communications session and the second data communications session are secured sessions; a first set of keys is used in the first data communications session; a second set of keys is used in the second data communications session; the probe message is secured with the first set of keys; the first router is a Border Gateway Protocol (BGP) router; the first data communications session and the second data communications session are Transmission Control Protocol (TCP) sessions; the first data communications session and the second data communications session support a Transmission Control Protocol Authentication Option (TCP-AO).

21. The method of claim 19, wherein the probe message is any of a BGP keepalive message, a retransmission packet of a previously transmitted packet to the first router, or a TCP probe segment.

* * * * *